(12) United States Patent
Zhuang (10) Patent No.: US 12,285,030 B2
(45) Date of Patent: Apr. 29, 2025

(54) PET CHEW PRODUCT

(71) Applicant: WENZHOU YUANFEI PET TOY PRODUCTS CO., LTD., Zhejiang (CN)

(72) Inventor: Mingyun Zhuang, Zhejiang (CN)

(73) Assignee: WENZHOU YUANFEI PET TOY PRODUCTS CO., LTD., Zhejiang (CN)

( * ) Notice: Subject to any disclaimer, the term of this patent is extended or adjusted under 35 U.S.C. 154(b) by 544 days.

(21) Appl. No.: 17/630,525

(22) PCT Filed: Dec. 2, 2019

(86) PCT No.: PCT/CN2019/122411
§ 371 (c)(1),
(2) Date: Jan. 27, 2022

(87) PCT Pub. No.: WO2021/022734
PCT Pub. Date: Feb. 11, 2021

(65) Prior Publication Data
US 2022/0240546 A1    Aug. 4, 2022

(30) Foreign Application Priority Data
Aug. 8, 2019    (CN) .......................... 201910730380.7

(51) Int. Cl.
| A23K 50/40 | (2016.01) |
| A23K 10/20 | (2016.01) |
| A23K 10/30 | (2016.01) |

(52) U.S. Cl.
CPC .............. *A23K 50/40* (2016.05); *A23K 10/20* (2016.05); *A23K 10/30* (2016.05)

(58) Field of Classification Search
CPC ........ A23K 50/40; A23K 10/20; A23K 10/30; A23K 20/147; A23K 20/163; A23K 20/179; A23K 40/25
See application file for complete search history.

(56) References Cited

U.S. PATENT DOCUMENTS

| 9,585,925 B1 * | 3/2017 | Bascharon ........... A61K 35/744 |
| 2005/0214349 A1 * | 9/2005 | Nie ........................ A23K 40/25 |
| | | 426/635 |

(Continued)

FOREIGN PATENT DOCUMENTS

| CN | 101946870 | 1/2011 |
| CN | 103857281 | 6/2014 |

(Continued)

OTHER PUBLICATIONS

KR-20190005074-A (clarivate machine translation) (Year: 2019).*
(Continued)

*Primary Examiner* — Elizabeth Gwartney
*Assistant Examiner* — Andrew E Merriam
(74) *Attorney, Agent, or Firm* — JCIPRNET (57) ABSTRACT

Disclosed is a pet chew product, comprising a tubular basic strip, wherein the tubular basic strip is internally provided with an axial channel with a polygonal cross section, and when the axial channel is squeezed, an upper wall of the axial channel protrudes downwards and is fitted with a corresponding engagement position on a lower wall thereof.

4 Claims, 6 Drawing Sheets

(56) References Cited

U.S. PATENT DOCUMENTS

| | | | | |
|---|---|---|---|---|
| 2014/0295052 A1* | 10/2014 | Elliott | ............... | A01K 15/026 |
| | | | | 426/656 |
| 2016/0143320 A1* | 5/2016 | Mahe | ............... | A23K 50/42 |
| | | | | 426/549 |
| 2017/0042191 A1* | 2/2017 | Green | ............... | A23K 10/20 |
| 2018/0235179 A1* | 8/2018 | Hague | ............... | A23K 10/26 |

FOREIGN PATENT DOCUMENTS

| | | | |
|---|---|---|---|
| CN | 207544031 | | 6/2018 |
| CN | 110403087 | | 11/2019 |
| KR | 20190005074 A | * | 1/2019 |

OTHER PUBLICATIONS

"International Search Report (Form PCT/ISA/210) of PCT/CN2019/122411," mailed on Apr. 29, 2020, with English translation thereof, pp. 1-4.

"Written Opinion of the International Searching Authority (Form PCT/ISA/237) of PCT/CN2019/122411," mailed on Apr. 29, 2020, pp. 1-4.

\* cited by examiner

PET CHEW PRODUCT

CROSS-REFERENCE TO RELATED APPLICATION

This application is a 371 of international application of PCT application serial no. PCT/CN2019/122411, filed on Dec. 2, 2019, which claims the priority benefit of China application no. 201910730380.7, filed on Aug. 8, 2019. The entirety of each of the above mentioned patent applications is hereby incorporated by reference herein and made a part of this specification.

FIELD OF THE DISCLOSURE

The disclosure relates to the field of health-care chew product for pets, in particular to a pet chew product.

DESCRIPTION OF RELATED ART

With the continuous improvement of standard of living and reduction of family size of domestic people, keeping pets has become a part of life for an increasing number of urbanites. An increasing level of people's love for pets has led to a rapid increase in the number of pets, which in turn has led to the gradual growth of the pet food industry. According to statistics, in the past ten years, the compound growth rate of domestic pet food market has exceeded 30%, making China one of the fastest growing regions in the world. Depending on the use of product, pet food may be divided into pet staple food and pet treats. Among them, pet staple food is an essential product for pets in daily life, and may be divided into three categories: dry food, semi-dry food and wet food. Pet treats are mainly for dogs and cats. There are various types of pet food, which may meet the diverse needs of pets such as increasing appetite, health care, and beautiful hair. Teeth cleaning bone is a kind of pet treats. Teeth cleaning bone is served as additional food other than the staple food for pets. The special structure and texture of the teeth cleaning bone may be used for pet teeth cleaning/grinding when pets bite the bone, thereby cleaning food residues left on pets' teeth, and cleaning the plaque which are left on pets' teeth and easily generate a large number of bacteria as well as produce a large number of corrosive acidic substances to cause dental caries or periodontal disease, remove pet odor, maintain pet oral health, and supplement nutrients for pets.

Existing tooth-cleaning bone products include animal dried skin products and extruded processed products. Animal dried skin products, as a conventional tooth-cleaning product, are directly made from cowhide, pigskin and other dried products through cutting and artificial processing. Since dried products such as cowhide and pigskin are made by bleaching, washing, drying and other processing steps, they have no meaty or very little meaty taste to attract pets to eat. Besides, animal skin products need to be cut and artificially processed into specific shapes, the processing efficiency is low and the texture of animal skin products is very dry and hard, and therefore the pets' teeth are often scratched or their oral mucosa are easily damaged when they eat. The pet tooth-cleaning bone processed with vegetable protein, vegetable starch, meat, etc. as raw materials may be divided into solid injection-molded bone products and tooth-cleaning bone products prepared by extrusion process. The solid injection-molded bone products with the effect of grinding and cleaning teeth are all hard in texture. Such products have a slippery biting surface, and it is easy for pets to swallow the whole bone and the bone will be stuck in their throats. Different from solid injection-molded bone products, the structure of products that are extruded into strips and then processed into bone shapes is relatively complex.

The existing method for preparing tooth-cleaning bone by extrusion process is that the raw material is extruded into a strip shape through an extruder production line, and then the strip shape is manually knotted at both ends into a bone shape to obtain a tooth-cleaning bone. This kind of tooth-cleaning bone products for pets generally has poor palatability, and it is difficult to make pets to eat tooth-cleaning bone and provide teeth-cleaning/grinding effect in addition to the staple food. The method of improving the palatability of the product and making the product more attractive to pets is mainly by adding meat. Therefore, in conventional technology, the tooth-cleaning bone product of this form is typically extruded into a strip after the raw material is extruded through an extruder production line. A meat strip is placed on the upper part of the obtained strip, or a meat strip is placed on the upper part of the strip and then folded to sandwich the meat strip in the middle, and then both ends of the strip are manually knotted into a bone shape to obtain a tooth-cleaning bone. Due to the small size of the tooth-cleaning bone itself, the production is time-consuming and the processing efficiency is low, and the position of the meat strip needs to be manually fixed after adding the meat strip in the tooth-cleaning bone processing process, and the both ends of the strip need to be knotted at the same time, the above factors are the main cause of limited processing efficiency. In the meantime, the existing tooth-cleaning bone obtained by extrusion processing has the disadvantage of poor tooth-cleaning effect, and it is difficult to realize the teeth-grinding/cleaning function of the tooth cleaning bone in the true sense.

In addition, the strip-like material after being produced is in a relatively softened state within a period of time. When in such state, the strip-like material is rolled and knotted into a bone shape. However, after a period of time, the strip-like material will become hardened, and the strip-like material will be damaged when being pressed, which makes it not suitable for consumption of pets.

SUMMARY OF THE DISCLOSURE

In order to solve the above-mentioned problems, the present disclosure provides a pet chew product.

A pet chew product includes a tubular basic strip. The tubular basic strip is internally provided with an axial channel with a polygonal cross section. When the axial channel is squeezed, an upper wall of the axial channel protrudes downwards and is fitted with a corresponding engagement position on a lower wall thereof.

Preferably, the cross section of the axial channel is an inverted isosceles triangle structure. When the axial channel is extruded, the bottom edge of the isosceles triangle protrudes outward along the center point to form a V-shaped protrusion, and the V-shaped protrusion is fitted with the apex of the isosceles triangle to form an engagement position. When the axial channel is squeezed, the bottom edge of the isosceles triangle protrudes outward along the center point to form the V-shaped protrusion. Under the circumstances, the V-shaped protrusion moves downward continuously to approach and fit the apex of the isosceles triangle. The apex area of the isosceles triangle is subjected to an outward opening force due to the downward movement of the V-shaped protrusion, so as to be opened outward, and finally a position-engagement fitting state similar to gear meshing is formed.

Preferably, the tubular basic strip is internally provided with an axial channel with an equilateral polygonal cross section. The equilateral polygon has an even number of equilateral sides. When the axial channel is squeezed, the multiple concave corners in the upper wall of the equilateral polygon are turned into tooth-like structures that protrude outwards, so that the upper wall and the lower wall finally form a position-engagement fitting state similar to gear meshing.

Preferably, the cross section of the tubular basic strip is an isosceles trapezoid structure. The axial channel is a prismatic structure, and the diagonal of the prism is coaxial with the symmetry axis of the isosceles trapezoid. When the axial channel is squeezed, the two upper lateral surfaces of the axial channel are correspondingly fitted with the two lower lateral surfaces. The prism is located on both sides of the upper part of the axial channel to form two upper lateral surfaces, and the prism is located on both sides of the lower part of the axial channel to form two lower lateral surfaces. When the axial channel is squeezed, the two upper lateral surfaces in the axial channel are changed from an inwardly concave V-shaped structure to a downwardly outward convex V-shaped tooth-like structure. The two lower lateral surfaces are stretched by the upper wall to form V-shaped engaging grooves opposite to the V-shaped tooth-like structure, so as to be engaged and fixed to each other.

Preferably, both ends of the tubular basic strip are knotted into a bone shape. Since pets are more interested in bone-like foods, the tubular basic strip is knotted into a bone-like shape to enhance the pet's appetite.

Preferably, the upper end surface of the tubular basic strip is provided with a first folding line groove, and the first folding line groove extends axially along the tubular basic strip. Therefore, it is convenient for the user to squeeze and fold the axial channel. In addition, the first folding line groove makes the upper end surface of the tubular basic strip present a narrow inner groove after being squeezed, making it easy for the pet's teeth to insert into the groove, so that the upper end surface of the tubular basic strip achieves a good teeth-cleaning effect on the pet's teeth in the process of inserting and chewing.

Preferably, both lateral surfaces of the tubular basic strip are provided with second folding line grooves, and the second folding line grooves extend axially along the tubular basic strip to facilitate the folding of the product.

Preferably, the axial channel is internally provided with a flaky flavored strip, and when the axial channel is squeezed, the flaky flavored strip is fixedly attached between the upper wall and the lower wall of the axial channel. Since the upper wall of the axial channel protrudes downward and is fitted with the engagement position of the lower wall, under the circumstances, the flaky flavored strip located between the upper wall and the lower wall not only receive the relative static friction between the upper wall and the lower wall, and because the upper wall and the lower wall are not straight structures, a certain folded angle is also generated on the flaky flavored strip, thereby improving the product stability and further preventing the flaky flavored strip from departing from the axial channel.

Preferably, the tubular basic strip is proportioned according to the parts by weight, including the following raw materials: 3000 to 5000 parts of corn starch, 500 to 1500 parts of chicken broth, 1000 to 2000 parts of rice flour, 500 to 1000 parts of soybean protein isolate, 400 to 800 parts of insect protein, 300 to 600 parts of sorbitol, 10 to 20 parts of kaempferol, 100 to 150 parts of pigment, 1000 to 1500 parts of glycerin and 1000 to 1500 parts of water.

Preferably, the insect protein is prepared from *Tenebrio molitor* insect protein, and the *Tenebrio molitor* insect protein is prepared from *Tenebrio molitor*.

The present disclosure has the following advantageous effects.

1. Since the cross section of the axial channel is a polygonal structure, in the softened state, when the axial channel is squeezed, the upper wall of the axial channel is pressed down, and the upper wall is relatively folded inwardly. Under the circumstances, the axial channel protrudes downward to form a tooth-like structure. The upper and lower walls that are close to each other are in a state similar to gear meshing under the circumstances, and the upper and lower walls are meshed and fixed with each other. After hardening, the product is formed, and its structure tends to be stable. Even if the axial channel continues to be subjected to downward pressure or relative shearing force after forming, the relative sliding between the upper wall and the lower wall may be prevented.

2. Even if the tubular basic strip undergoes a certain amount of elastic deformation due to force or temperature changes, since there will be a certain amount of narrow gap between the upper wall and the lower wall, the deformation requirements may still be satisfied, thereby further improving the stability of the product.

3. When the axial channel is extruded, both sides of the upper end surface of the tubular basic strip are turned inward under the circumstances, and a downward recess is naturally formed in the middle of the upper end surface, so the upper surface of the tubular basic strip after forming is am uneven structure rather than a smooth flat structure. The flat structure allows pets to directly insert their teeth into the recess to prevent the teeth from sliding during chewing. The parts on both sides of the upper end surface of the tubular basic strip form a clamping effect on the pet's teeth, which improves the palatability of the product and facilitates the cleaning of the pet's teeth.

4. The upper part of the tubular basic strip is recessed downward under the circumstances, the fracture of the tubular basic strip is downward after being chewed by the pet, and the thickness of the tubular basic strip is greater than that of the general strip-like material, so it is possible to effectively prevent the strip-like material from scratching the pet's mouth.

DESCRIPTION OF EMBODIMENTS

The present disclosure will be further described below with reference to the accompanying drawings and embodiments.

Figure 1:
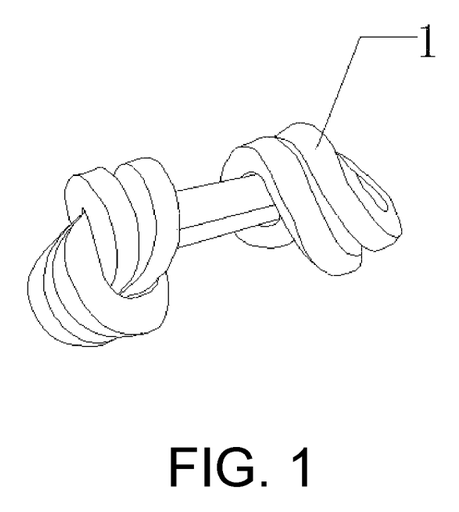
FIG. 1 is a schematic structural view of the first embodiment in the molding state.
Figure 2:
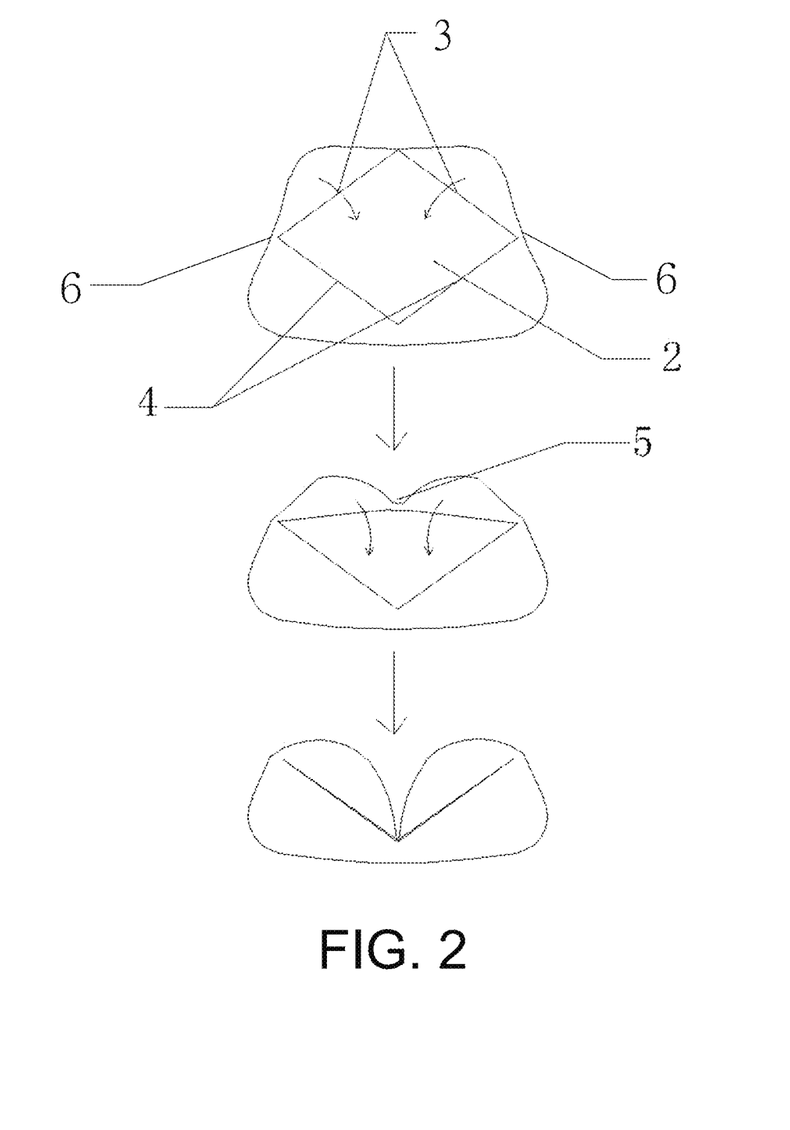
FIG. 2 is a schematic view showing working principle of extrusion and molding of the first embodiment.
Figure 3:
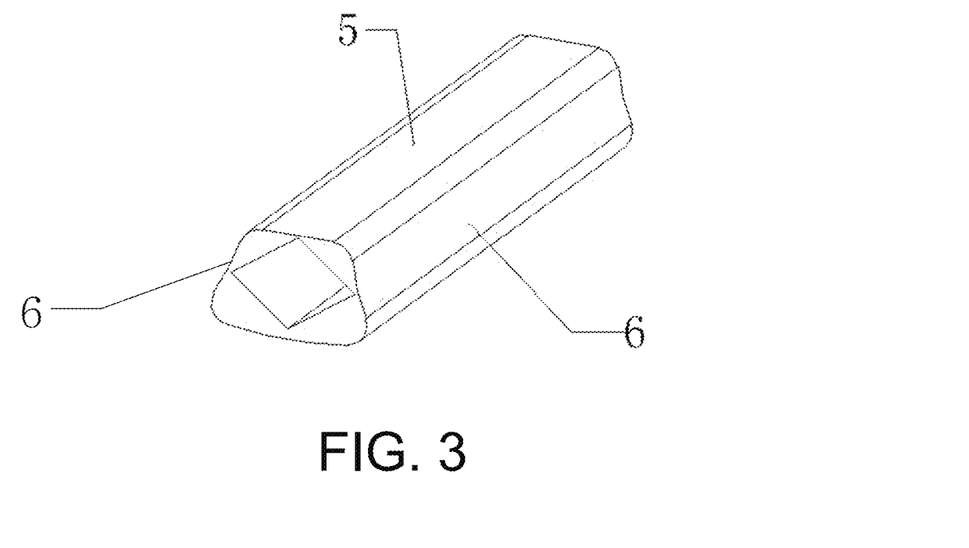
FIG. 3 is a schematic view of the original structure of the first embodiment in an unmolded state.

The first embodiment: A pet chew product includes a tubular basic strip 1, and both ends of the tubular basic strip 1 are knotted into a bone shape. Since pets are more interested in bone-like foods, the tubular basic strip 1 is knotted into a bone-like shape to enhance the pet's appetite. The cross-section of the tubular basic strip 1 is an isosceles trapezoid structure, the axial channel 2 is a prismatic structure, and the diagonal of the prism is coaxial with the symmetry axis of the isosceles trapezoid. When the axial channel 2 is squeezed, the two upper lateral surfaces 3 and the two lower lateral surfaces 4 of the axial channel 2 are correspondingly fitted together. The two upper lateral surfaces 3 are formed through the prism on both sides of the upper part of the axial channel 2, and the two lower lateral surfaces 4 are formed through the prism on both sides of the lower part of the axial channel 2. When the axial channel 2 is squeezed, the two upper lateral surfaces 3 in the axial channel 2 are changed from an inwardly concave V-shaped structure to a downwardly outward convex V-shaped tooth-like structure. The two lower lateral surfaces 4 are stretched by the upper wall to form V-shaped engaging grooves opposite to the V-shaped tooth-like structure, so as to be engaged and fixed to each other. The upper end surface of the tubular basic strip 1 is provided with a first folding line groove 5, and the first folding line groove 5 extends axially along the tubular basic strip 1. Therefore, it is convenient for the user to squeeze and fold the axial channel 2. Moreover, after the first folding line groove 5 makes the tubular basic strip 1 squeezed, the upper end surface of the tubular basic strip 1 presents a narrow inner groove, making it easy for the pet's teeth to insert into the groove, so that the upper end surface of the tubular basic strip 1 achieves a good teeth-cleaning effect on the pet's teeth in the process of inserting and chewing. Both lateral surfaces of the tubular basic strip 1 are provided with second folding line grooves 6, and the second folding line grooves 6 extend axially along the tubular basic strip 1. The first folding line groove 5 and the second folding line groove 6 of this product are arc-shaped concave structures.

The tubular basic strip 1 is proportioned according to parts by weight and includes the following raw materials: 3000 parts of corn starch, 500 parts of chicken broth, 1000 parts of rice flour, 500 parts of soybean protein isolate, 400 parts of insect protein, 300 parts of sorbitol, 10 parts of kaempferol, 100 parts of fruit green liquid, 1000 part of glycerin and 1000 parts of water. The insect protein is prepared from *Tenebrio molitor* insect protein, and the *Tenebrio molitor* insect protein is prepared from *Tenebrio molitor*.

The present disclosure adopts insect protein, especially *Tenebrio molitor* as the main raw material. The dry product of *Tenebrio molitor* contains 30% of fat, more than 50% of protein, and further contains major elements such as phosphorus, potassium, iron, sodium, aluminum and various trace elements, having a has high application value. *Tenebrio molitor* is not only rich in protein, but also contains a comprehensive variety of amino acids with a reasonable composition. *Tenebrio molitor* has a variety of unique nutrients that are easy to digest and absorb. The pet protein powder prepared may improve the immunity of the body, resist fatigue, lower blood lipids, resist cancer, promote metabolism and achieve other effects, as well as enhance the immunity of pets.

Figure 4:
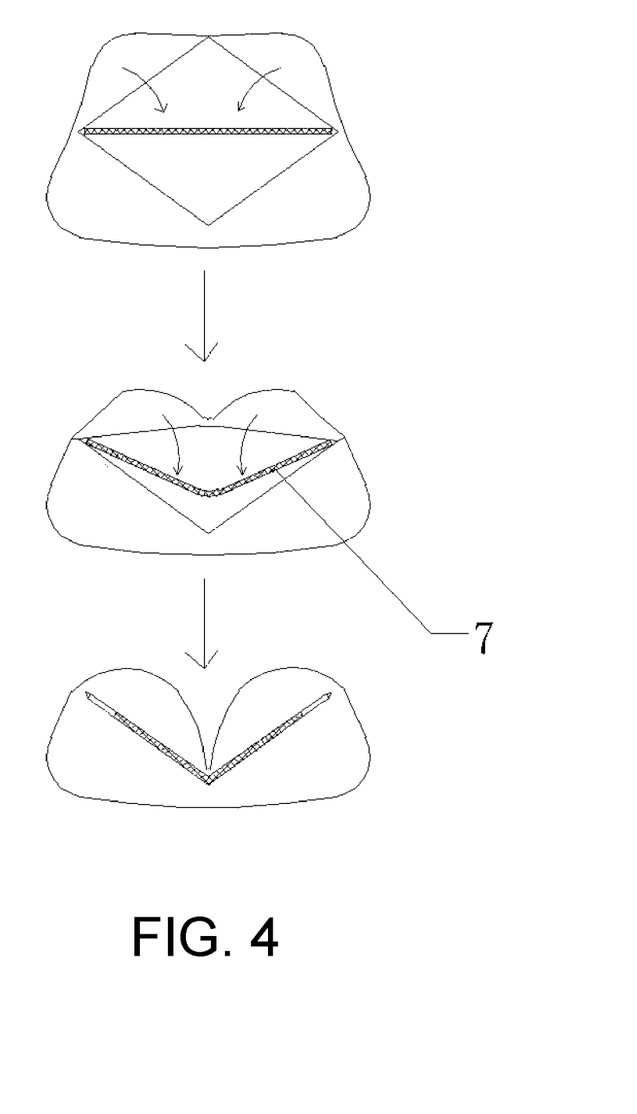
FIG. 4 is a schematic view showing working principle of extrusion and molding in the second embodiment.

The second embodiment: A pet chew product includes a tubular basic strip 1, and both ends of the tubular basic strip 1 are knotted into a bone shape. Since pets are more interested in bone-like foods, the tubular basic strip 1 is knotted into a bone-like shape to enhance the pet's appetite. The cross-section of the tubular basic strip 1 is an isosceles trapezoid structure, the axial channel 2 is a prismatic structure, and the diagonal of the prism is coaxial with the symmetry axis of the isosceles trapezoid. When the axial channel 2 is squeezed, the two upper lateral surfaces 3 and the two lower lateral surfaces 4 of the axial channel 2 are correspondingly fitted together. The two upper lateral surfaces 3 are formed through the prism on both sides of the upper part of the axial channel 2, and the two lower lateral surfaces 4 are formed through the prism on both sides of the lower part of the axial channel 2. When the axial channel 2 is squeezed, the two upper lateral surfaces 3 in the axial channel 2 are changed from an inwardly concave V-shaped structure to a downwardly outward convex V-shaped tooth-like structure. The two lower lateral surfaces 4 are stretched by the upper wall to form V-shaped engaging grooves opposite to the V-shaped tooth-like structure, so as to be engaged and fixed to each other.

The flaky flavored strip 7 is placed horizontally in the axial channel 2, and the two sides of the flaky flavored strip 7 are respectively two corners of a prism. When the axial channel 2 is squeezed, the flaky flavored strip 7 is fixedly attached between the upper wall and the lower wall of the axial channel 2. Since the upper wall of the axial channel 2 protrudes downward and is fitted with the engagement position of the lower wall, under the circumstances, the flaky flavored strip 7 located between the upper wall and the lower wall not only receive the relative static friction between the upper wall and the lower wall, and because the upper wall and the lower wall are not straight structures, a certain folded angle is also generated on the flaky flavored strip 7, thereby improving the product stability and further preventing the flaky flavored strip 7 from departing from the axial channel 2.

The tubular basic strip 1 is proportioned according to parts by weight and includes the following raw materials: 4000 parts of corn starch, 1000 parts of chicken broth, 1500 parts of rice flour, 800 parts of soybean protein isolate, 600 parts of insect protein, 500 parts of sorbitol, 15 parts of kaempferol, 100 parts of white pigment and 50 parts of allure red liquid, 1500 part of glycerin and 1500 parts of water. The ratio of pigment to water in this product is 1:100, except for white pigment. The insect protein is prepared from *Tenebrio molitor* insect protein, and the *Tenebrio molitor* insect protein is prepared from *Tenebrio molitor*. The material of the flaky flavored strip 7 is made of meat material, so as to improve the pet's appetite.

Figure 5:
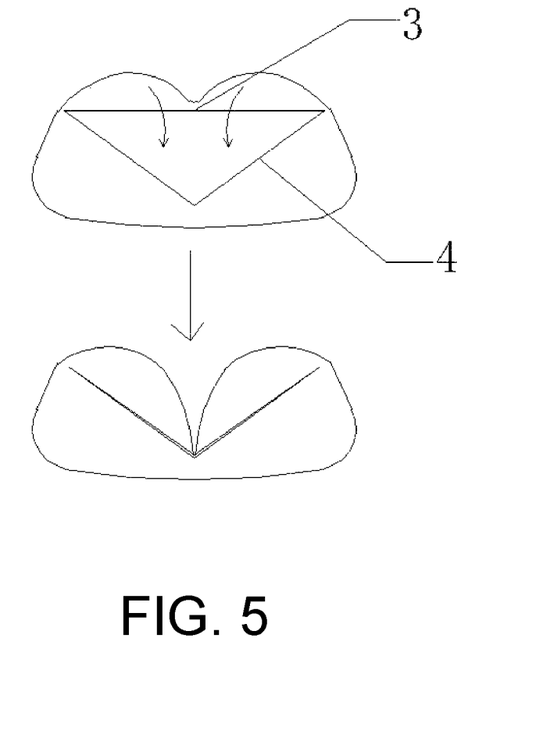
FIG. 5 is a schematic view showing working principle of extrusion and molding in the third embodiment.

The third embodiment: A pet chew product includes a tubular basic strip 1, the cross section of the axial channel 2 is an inverted isosceles triangle structure. When the axial channel 2 is extruded, the bottom edge of the isosceles triangle protrudes outward along the center point to form a V-shaped protrusion, and the V-shaped protrusion is fitted with the apex of the isosceles triangle to form an engagement position. The bottom of the isosceles triangle extends to form the upper lateral surface 3, and the two sides of the isosceles triangle extend to form two corresponding lower lateral surfaces 4.

When the axial channel 2 is squeezed, the upper lateral surface 3 of the isosceles triangle protrudes downward along the center line to form the V-shaped protrusion. Under the circumstances, the V-shaped protrusion moves downward continuously to approach and fit the apex of the isosceles triangle. The apex area of the isosceles triangle is subjected to an outward opening force due to the downward movement of the V-shaped protrusion, so as to be opened outward, and finally a position-engagement fitting state similar to gear meshing is formed.

Figure 6:
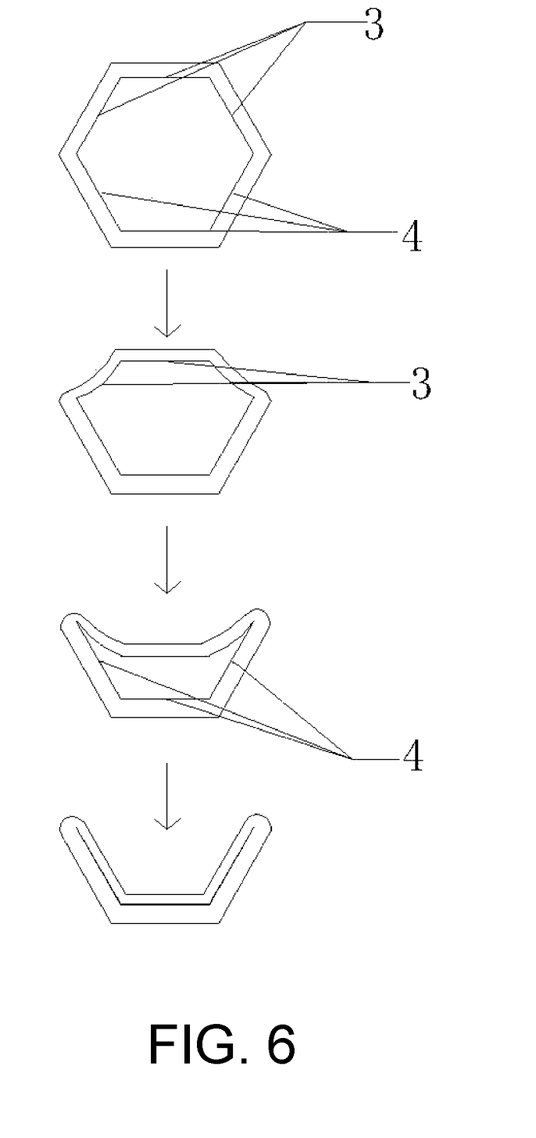
FIG. 6 is a schematic view showing working principle of extrusion and molding in the fourth embodiment.

The fourth embodiment: The tubular basic strip 1 is internally provided with an axial channel 2 with a regular hexagonal cross-section. The upper lateral surface 3 and the lower lateral surface 4 of the axial channel 2 bisect a regular hexagon. When the axial channel 2 is squeezed, the two inwardly concave corners in the upper wall of the regular hexagon become outwardly convex tooth-like structures. In this manner, the upper wall and the lower wall finally form a position-engagement fitting state similar to gear meshing. Both lateral surfaces of the tubular basic strip 1 are provided with second folding line grooves 6, and the second folding line grooves 6 extend axially along the tubular basic strip 1 to facilitate the folding of the product.

In order to prevent the product from sliding when being chewed by the pet, the outer surface of the tubular basic strip may be designed with anti-slip texture. The upper wall described herein consists of a plurality of upper lateral surfaces 3, while the lower wall consists of a plurality of lower lateral surfaces 4.

Clearly, the above-mentioned embodiments of the present disclosure are only examples for illustrating the present disclosure, and are not intended to limit the embodiments of the present disclosure. For those of ordinary skill in the art, changes or modifications in other different forms can also be made on the basis of the above description. All implementations need not and cannot be exhaustive here. These obvious changes or changes derived from the essential spirit of the present disclosure still belong to the scope to be protected by the present disclosure.

What is claimed is:

1. A pet chew product, comprising a tubular basic strip, wherein the tubular basic strip is internally provided with an axial channel with an equilateral polygonal cross section, and the equilateral polygon has an even number of equilateral sides, the cross section of the tubular basic strip is an isosceles trapezoid structure, the axial channel is a prismatic structure, and a diagonal of the prism is coaxial with a symmetry axis of the isosceles trapezoid, the axial channel has two upper lateral surfaces adjacent to each other and two lower lateral surfaces adjacent to each other, and, further wherein, when the axial channel is squeezed, the two first lateral surfaces of the axial channel are correspondingly fitted with the two second lateral surfaces.

2. The pet chew product according to claim 1, wherein the tubular basic strip has two ends opposite each other, and the two ends of the tubular basic strip are knotted into a bone shape.

3. The pet chew product according to claim 1, wherein the axial channel is internally provided with a flaky flavored strip, and when the axial channel is squeezed, the flaky flavored strip is fixedly attached between the two upper lateral surfaces and the two lower lateral surfaces of the axial channel.

4. The pet chew product according to claim 1, wherein the tubular basic strip is proportioned according to parts by weight, and comprises the following raw materials: 3000 to 5000 parts of corn starch, 500 to 1500 parts of chicken broth, 1000 to 2000 parts of rice flour, 500 to 1000 parts of soybean protein isolate, 400 to 800 parts of insect protein, 300 to 600 parts of sorbitol, 10 to 20 parts of kaempferol, 100 to 150 parts of pigment, 1000 to 1500 parts of glycerin and 1000 to 1500 parts of water.

\* \* \* \* \*